Patented Feb. 14, 1928.

1,659,190

UNITED STATES PATENT OFFICE.

LEOPOLD BUB, OF MANNHEIM, GERMANY, ASSIGNOR TO I. G. FARBENINDUSTRIE AKTIENGESELLSCHAFT, OF FRANKFORT-ON-THE-MAIN, GERMANY.

MANUFACTURE OF PURE UREA.

No Drawing. Application filed November 9, 1925, Serial No. 68,022, and in Germany November 15, 1924.

Urea produced on a technical scale usually contains undesirable impurities, especially iron oxids and other metal compounds produced by a corrosion of the apparatus and imparting to the urea a yellow red to brown color. In order to obtain a pure product, it was hitherto necessary to dissolve the urea and to purify it by means of animal charcoal.

I have now found that pure, white or colorless urea can be obtained by treating concentrated solutions of technical urea with oxidizing agents in the presence of ammonia. Generally, small quantities of ammonia are sufficient, but at least about ½ to 1 per cent should be employed. As oxidizing agents such as leave no soluble residues which it would be difficult to separate from the urea, are preferred, for example air, oxygen, manganese dioxid and the like which are preferably added in a finely divided form. The oxidation and the removal of the precipitated impurities following the oxidation can be effected at relatively low temperatures, for example at 60 degrees to 70 degrees centigrade and in a short time so that practically no urea is lost by saponification.

By the method explained above, especially the compounds of heavy metals are precipitated practically completely in a form in which they can easily be separated. After separation from the precipitate by filtration, centrifuging or any suitable means, a clear, colorless solution is obtained from which by crystallization or complete evaporation, a pure, snow-white urea is obtained.

The following example serves to further illustrate the nature of my invention which however is not restricted to this example.

5000 litres of a urea solution, as it is obtained in the manufacturing process, containing 70 per cent, by weight, of urea and about 1.5 per cent of ammonia, are oxidized with air at the rate of 120 cubic metres per hour at a temperature of about 70 degrees to 75 degrees centigrade. The air is tangentially introduced through several fine nozzles into the solution which is vigorously stirred up thereby. The oxidation is complete after 1½ to 2 hours and the solution is then filtered while still hot. By evaporation or crystallization a pure, white urea is obtained.

I claim:

1. The process of manufacturing colorless urea which consists in treating a concentrated solution of impure urea with oxidizing agents in the presence of ammonia and separating the urea solution from the precipitated impurities the oxidizing agent and temperature being so chosen that practically no conversion of urea takes place.

2. The process of manufacturing colorless urea which consists in treating a concentrated solution of impure urea with an oxidizing agent leaving no soluble products behind and not chemically influencing the urea, in the presence of ammonia and at a moderately elevated temperature but lower than that at which any substantial saponification of the urea would occur, and separating the urea solution from the precipitated impurities.

3. The process of manufacturing colourless urea which consists in treating a concentrated solution of impure urea with a gaseous oxidizing agent in the presence of ammonia and separating the urea solution from the precipitated impurities, the oxidizing agent and temperature being so chosen, that practically no conversion of urea takes place.

4. The process of manufacturing colourless urea which consists in treating a concentrated solution of impure urea with a gaseous oxidizing agent not chemically influencing the urea, in the presence of ammonia and at a moderately elevated temperature, but lower than that at which any substantial saponification of the urea would occur, and separating the urea solution from the precipitated impurities.

In testimony whereof I have hereunto set my hand.

LEOPOLD BUB.